US012732647B2

(12) United States Patent
Li et al.

(10) Patent No.: US 12,732,647 B2

(45) Date of Patent: Sep. 8, 2026

(54) RENDERING FOR ELECTRONIC DEVICES

(71) Applicant: Apple Inc., Cupertino, CA (US)

(72) Inventors: Yuhui Li, Cupertino, CA (US); Chendi Zhang, Belmont, CA (US); Andrey Pokrovskiy, Mountain View, CA (US); Wanqing Xin, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/922,299

(22) Filed: Oct. 21, 2024

(65) Prior Publication Data

US 2025/0047909 A1 Feb. 6, 2025

Related U.S. Application Data

(63) Continuation of application No. 17/899,543, filed on Aug. 30, 2022, now Pat. No. 12,126,847.

(Continued)

(51) Int. Cl.

*H04N 21/234* (2011.01)
*H04N 21/24* (2011.01)
*H04N 21/472* (2011.01)

(52) U.S. Cl.

CPC ... *H04N 21/23418* (2013.01); *H04N 21/2408* (2013.01); *H04N 21/472* (2013.01)

(58) Field of Classification Search

CPC ......... H04N 21/23418; H04N 21/2408; H04N 21/472; G09G 5/001; G09G 2340/0435;

(Continued)

(56) References Cited

U.S. PATENT DOCUMENTS 8,854,381 B2 * 10/2014 Mantor ..................... G06T 1/20 345/505
9,019,428 B2 4/2015 Shukla et al.

(Continued)

FOREIGN PATENT DOCUMENTS

CN 201491423 U 5/2010
CN 102831630 A 12/2012

(Continued)

OTHER PUBLICATIONS

Smith, "New iPhone 8 schematics leak offers several exciting revelations," Apr. 2017, retrieved from https://bgr.com//2017/01/24/iphone-8-rumors.schematics-leaks/, 4 pages.

(Continued)

*Primary Examiner* — Adil Ocak

(74) *Attorney, Agent, or Firm* — BAKERHOSTETLER

(57) ABSTRACT

Aspects of the subject technology relate to providing frame rate arbitration for electronic devices. Frame rate arbitration can include determining a global frame rate based on frame rate parameters from one or more animation sources, and providing the global frame rate to the animation sources. The frame rate parameters for various animations sources can have differing preferred, minimum, and/or maximum frame rates, and the global frame rate may be determined for concurrent display of multiple animations from the multiple animation sources. In one or more implementations, frame rate arbitration can also be performed based on frame rate parameters from an input source.

20 Claims, 14 Drawing Sheets

Related U.S. Application Data

(60) Provisional application No. 63/243,693, filed on Sep. 13, 2021.

(58) Field of Classification Search
CPC ........... G09G 2340/10; G09G 2354/00; G09G 5/363; G09G 5/377; G09G 5/34; G09G 2340/12; G09G 2370/20; G09G 5/14
USPC .............................................................. 725/9
See application file for complete search history.

(56) References Cited

U.S. PATENT DOCUMENTS

| | | | | |
|---|---|---|---|---|
| 9,589,540 | B2 * | 3/2017 | Wu | G06F 1/3265 |
| 10,325,573 | B2 * | 6/2019 | Wood | G09G 5/391 |
| 11,068,088 | B2 | 7/2021 | Tripathi et al. | |
| 11,568,588 | B2 | 1/2023 | Spence | |
| 2008/0303828 | A1 | 12/2008 | Marchant et al. | |
| 2011/0096077 | A1 | 4/2011 | Jarrett | |
| 2012/0044251 | A1 | 2/2012 | Mark et al. | |
| 2014/0082518 | A1 | 3/2014 | Bhogal et al. | |
| 2014/0267360 | A1 | 9/2014 | Finkel | |
| 2016/0335743 | A1 | 11/2016 | Kostantinov | |
| 2017/0352322 | A1 | 12/2017 | Spence et al. | |
| 2018/0261190 | A1 | 9/2018 | Yi et al. | |
| 2018/0261191 | A1 | 9/2018 | Yi et al. | |
| 2019/0180705 | A1 | 6/2019 | Choudha et al. | |
| 2020/0007914 | A1 | 1/2020 | Peng et al. | |

FOREIGN PATENT DOCUMENTS

| | | | |
|---|---|---|---|
| CN | 102914941 | A | 2/2013 |
| CN | 104220389 | A | 12/2014 |
| CN | 106657681 | A | 5/2017 |
| CN | 107680549 | A | 2/2018 |
| KR | 10-2016-0019896 | | 2/2016 |
| KR | 10-2020-0091962 | | 7/2020 |
| KR | 10-2021-0101627 | | 8/2021 |
| WO | WO 2015/166319 | A1 | 11/2015 |

OTHER PUBLICATIONS

Chinese Office Action from Chinese Patent Application No. 202111548412.5, dated Dec. 20, 2023, 40 pages including English language translation.

Extended European Search Report from European Patent Application No. 22195401.9, dated May 23, 2023, 22 pages.

Partial European Search Report from European Patent Application No. 22195401.9, dated Jan. 30, 2023, 18 pages.

Korean Written Decision on Registration from Korean Patent Application No. 2022-0113488, dated Feb. 21, 2024, 8 pages including machine-generated English language translation.

Korean Office Action from Korean Patent Application No. 10-2022-0113488, dated Jun. 22, 2023, 19 pages including English language translation.

European Office Action from European Patent Application No. 22195401.9, dated Oct. 28, 2024, 12 pages.

European Patent Application No. 22195401.9; European Office Action dated Mar. 5, 2026, 12 pages.

Chinese Patent Application 202211103371.3; First Office Action dated Jan. 22, 2026, 15 pages with machine translation.

Chinese Patent Application 202211103371.3; Search Report dated Jan. 22, 2026, 4 pages with English Translation.

Chinese Patent Application 2022111033713; Search Report dated Jun. 29, 2026, 7 pages with machine translation.

Chinese Patent Application 2022111033713; Notification to Grant Patent dated Jun. 29, 2026, 4 pages with machine translation.

* cited by examiner

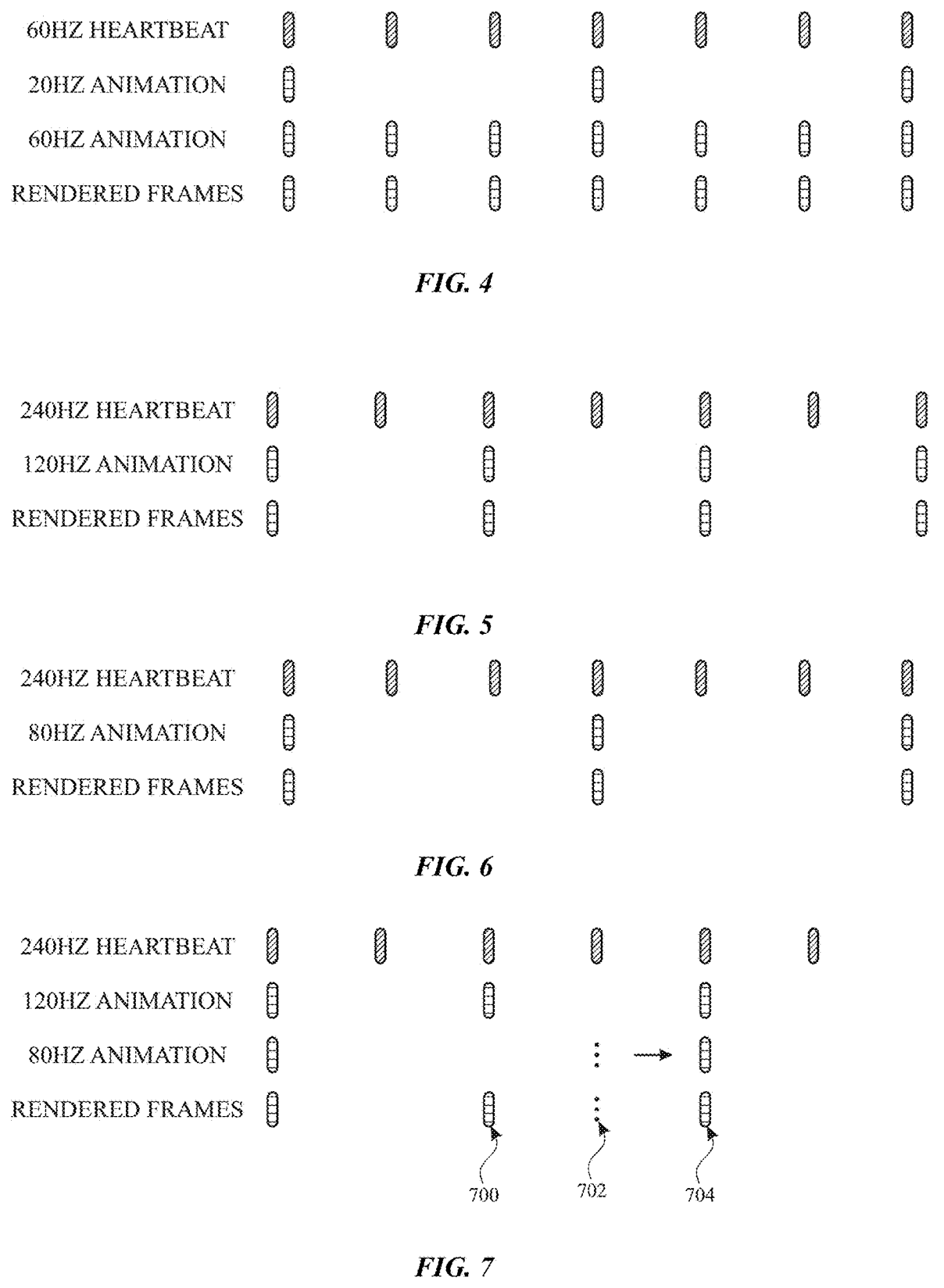

60HZ HEARTBEAT
20HZ ANIMATION
60HZ ANIMATION
RENDERED FRAMES

FIG. 4

240HZ HEARTBEAT
120HZ ANIMATION
RENDERED FRAMES

FIG. 5

240HZ HEARTBEAT
80HZ ANIMATION
RENDERED FRAMES

FIG. 6

240HZ HEARTBEAT
120HZ ANIMATION
80HZ ANIMATION
RENDERED FRAMES
700
702
704

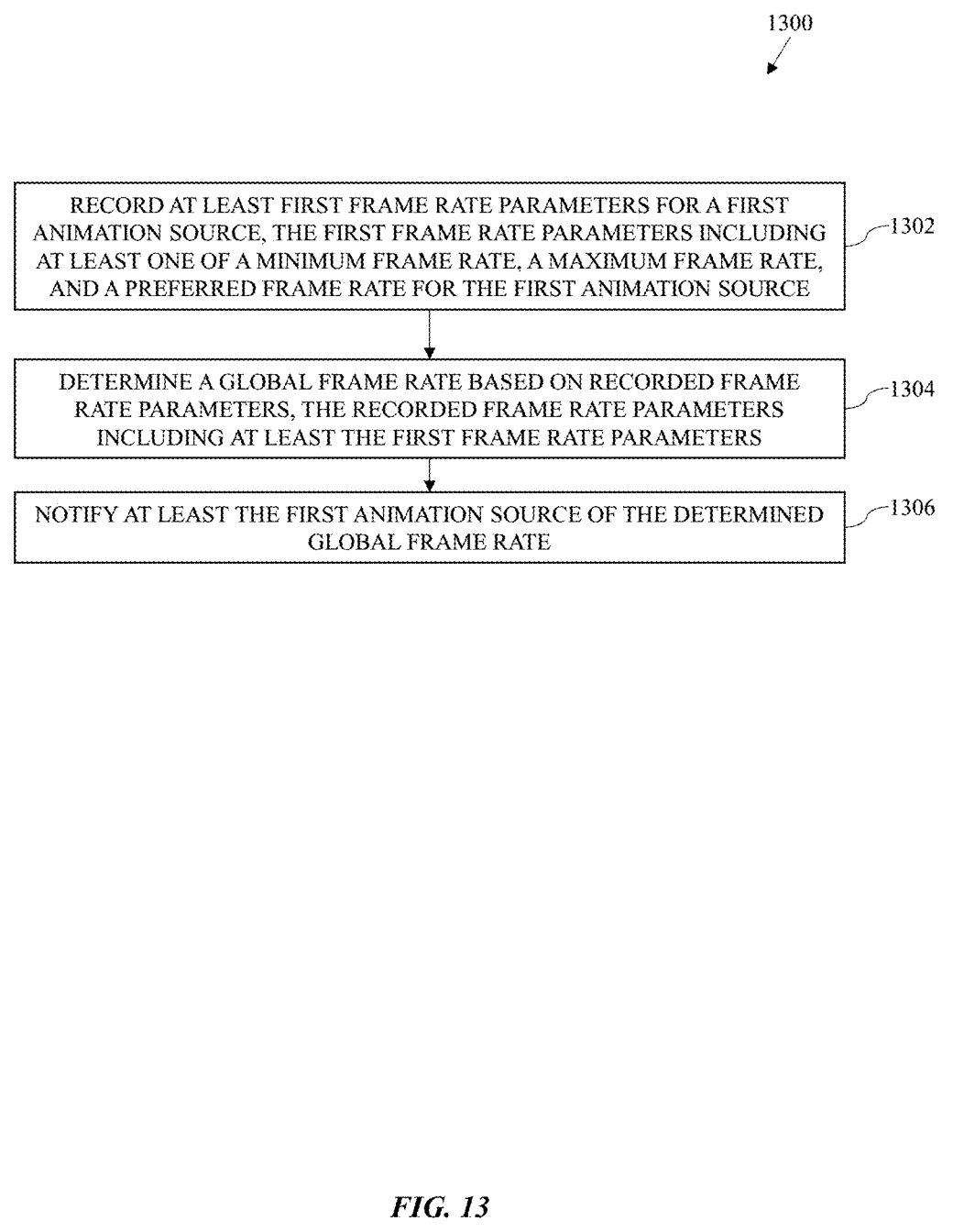

RECORD AT LEAST FIRST FRAME RATE PARAMETERS FOR A FIRST ANIMATION SOURCE, THE FIRST FRAME RATE PARAMETERS INCLUDING AT LEAST ONE OF A MINIMUM FRAME RATE, A MAXIMUM FRAME RATE, AND A PREFERRED FRAME RATE FOR THE FIRST ANIMATION SOURCE — 1302

DETERMINE A GLOBAL FRAME RATE BASED ON RECORDED FRAME RATE PARAMETERS, THE RECORDED FRAME RATE PARAMETERS INCLUDING AT LEAST THE FIRST FRAME RATE PARAMETERS — 1304

NOTIFY AT LEAST THE FIRST ANIMATION SOURCE OF THE DETERMINED GLOBAL FRAME RATE — 1306

*FIG. 13*

RENDERING FOR ELECTRONIC DEVICES

CROSS REFERENCE TO RELATED APPLICATIONS

This application is a continuation of U.S. patent application Ser. No. 17/899,543, entitled "Rendering for Electronic Devices," filed on Aug. 30, 2022, which, in turn, claims the benefit of priority to U.S. Provisional Patent Application No. 63/243,693, entitled, "Rendering for Electronic Devices", filed on Sep. 13, 2021, the disclosures of which are hereby incorporated herein in their entirety.

TECHNICAL FIELD

The present description relates generally to electronic devices, including, for example, rendering for electronic devices.

BACKGROUND

Electronic devices often include multiple sources of content that is to be displayed using a display of the electronic device.

BRIEF DESCRIPTION OF THE DRAWINGS

Certain features of the subject technology are set forth in the appended claims. However, for purpose of explanation, several implementations of the subject technology are set forth in the following figures.

FIG. 4 shows a timing diagram illustrating aspects of rendering multiple animations at multiple frame rates for a display having a native refresh rate in accordance with one or more implementations.

FIG. 5 shows a timing diagram illustrating aspects of rendering an animation at a frame rate for a display having a higher native refresh rate than the native refresh rate of FIG. 4 in accordance with one or more implementations.

FIG. 6 illustrates a timing diagram illustrating aspects of rendering an animation at another frame rate for the display of FIG. 5 in accordance with one or more implementations.

FIG. 7 shows a timing diagram illustrating aspects of rendering multiple animations at incompatible frame rates.

FIG. 13 illustrates a flow diagram of an example process for operating an electronic device to display multiple animations according to aspects of the subject technology.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Implementations of the subject technology described herein provide for concurrent display of multiple animations from multiple animation sources, including in scenarios in which the multiple animation sources have different preferred frame rates and/or other frame rate constraints. In one or more implementations, the subject technology facilitates increased usage of variable display frame rates for a device display, which can reduce power consumption by the display. In one or more implementations, frame rate arbitration systems and methods are provided in which one or more animation sources provide frame rate parameters to a system process, the system process determines a global frame rate for rendering display frames, and the system process informs the one or more animation sources of the global frame rate. The animation sources can then provide frames at the global frame rate or another frame rate that is compatible with the global frame rate.

Figure 1:
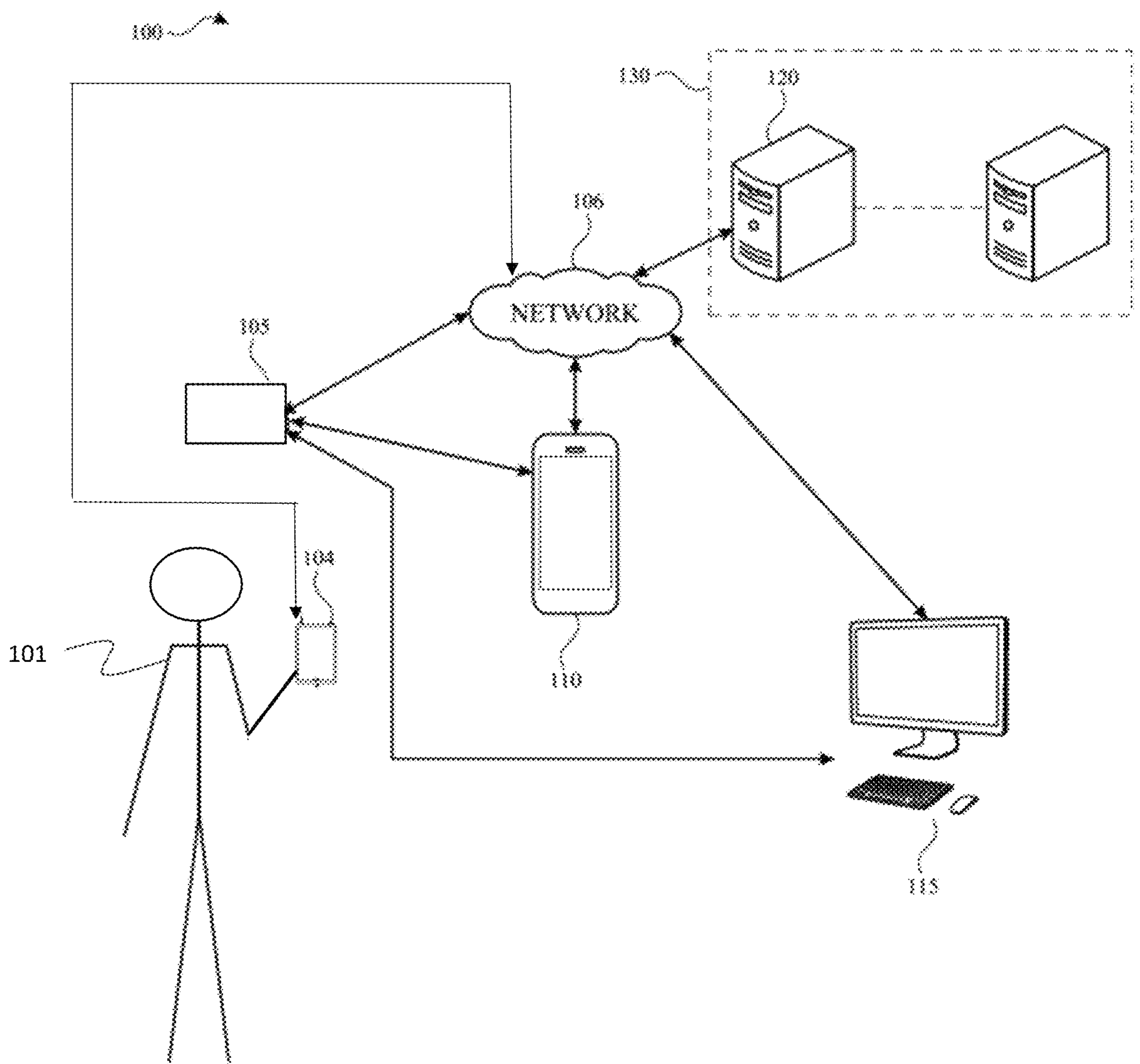
FIG. 1 illustrates an example system architecture including various electronic devices that may implement the subject system in accordance with one or more implementations.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 104, an electronic device 105, an electronic device 110, an electronic device 115, and a server 120. For explanatory purposes, the system architecture 100 is illustrated in FIG. 1 as including the electronic device 104, the electronic device 105, the electronic device 110, the electronic device 115, and the server 120; however, the system architecture 100 may include any number of electronic devices and any number of servers.

Any or all of the electronic device 104, the electronic device 105, and the electronic device 110 may be implemented as a smart phone, a tablet device, another portable electronic device, and/or a wearable device such as a smart watch or other wearable device, that includes a display system capable of displaying rendered display frames (e.g., to a user 101). Any or all of the electronic device 104, the electronic device 105, and the electronic device 110 may be powered with a battery and/or any other power supply.

In some examples, any or all of the electronic device 104, the electronic device 105, and the electronic device 110 may display rendered display frames, which may include one or more animations and/or static content. Static content may include content that is unchanging on the display over multiple display frames and/or human perceptible periods of time, such as time periods greater than one second or a fraction of a second, or longer periods such as periods up to or longer than a minute. Animations may include content that changes on the display over a series of display frames and/or human perceptible periods of time such as content that changes continuously, occasionally or periodically over the course of a second, a fraction of a second, several seconds and/or longer periods of time such as minutes, hours, or days. In one or more implementations, the displayed animations and/or static content can be perceived by the user and interacted with in a real-time manner. Additionally, the electronic device 104, the electronic device 105, and the electronic device 110 may output sound, and/or haptic or tactile feedback to the user. As discussed in further detail hereinafter, the rendered display frames may be provided to the display at a global frame rate that is determined, using a frame rate arbitration process that is based on frame rate parameters provided by one or more animation sources for which animations are included in the displayed frames.

The network 106 may communicatively (directly or indirectly) couple, for example, the electronic device 105, the electronic device 110 and/or the electronic device 115 with the server 120 and/or one or more electronic devices of one or more other users. In one or more implementations, the network 106 may be an interconnected network of devices that may include, or may be communicatively coupled to, the Internet.

Any or all of the electronic device 104, the electronic device 105, and/or the electronic device 110 may include a touchscreen or other touch-sensitive surface that includes touch sensor elements configured to sense touch events from a stylus, a user's finger, or other input device. Any or all of the electronic device 104, the electronic device 105, and the electronic device 110 may be, for example, a smartphone that includes a touchscreen or other touch-sensitive surface, a portable computing device such as a laptop computer that includes a touchscreen or other touch-sensitive surface, a peripheral device that includes a touchscreen or other touch-sensitive surface (e.g., a digital camera, headphones), a tablet device that includes a touchscreen or other touch-sensitive surface, a wearable device that includes a touchscreen or other touch-sensitive surface such as a watch, a band, and the like, any other appropriate device that includes, for example, a touchscreen or other touch-sensitive surface, or any electronic device with a touchpad. In one or more implementations, the electronic device 104, the electronic device 105, and/or the electronic device 110 may not include a touchscreen but may support touchscreen-like input gestures. In FIG. 1, by way of example, the electronic device 110 and the electronic device 104 are depicted as a mobile smartphone device with a touchscreen, and the electronic device 105 is depicted as a tablet device. In one or more implementations, the electronic device 104, the electronic device 105, the electronic device 110, the electronic device 115 and/or the electronic device 105 may be, and/or may include all or part of, the electronic system discussed below with respect to FIG. 14. In one or more implementations, the electronic device 104, the electronic device 105, and/or the electronic device 110 may be or include another device such as an Internet Protocol (IP) camera, a tablet, or a peripheral device such as an electronic stylus, etc.

The electronic device 115 may be, for example, desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 14, and/or may implement a frame arbitration process as described herein.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for extended reality environments. In an implementation, the server 120 may function as a cloud storage server that stores any of the aforementioned extended reality content generated by the above-discussed devices and/or the server 120.

Figure 2:
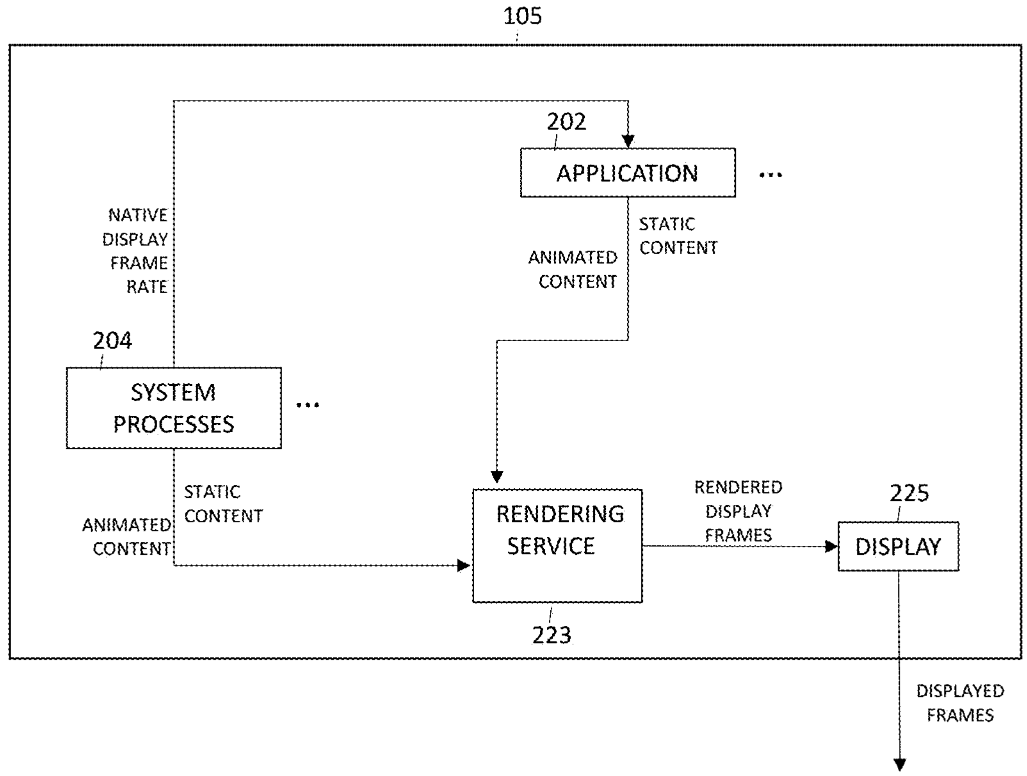
FIG. 2 illustrates schematic diagram of an example computing device that may implement aspects of the subject technology.

FIG. 2 illustrates an example architecture that may be implemented by the electronic device 105 in accordance with one or more implementations of the subject technology. For explanatory purposes, portions of the architecture of FIG. 2 are described as being implemented by the electronic device 105 of FIG. 1, such as by a processor and/or memory of the electronic device; however, appropriate portions of the architecture may be implemented by any other electronic device, including the electronic device 104, the electronic device 110, electronic device 115, and/or server 120. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

Various portions of the architecture of FIG. 2 can be implemented in software or hardware, including by one or more processors and a memory device containing instructions, which when executed by the processor cause the processor to perform the operations described herein.

In the example of FIG. 2, one or more content sources, such as application(s) 202 and/or system process(es) 204, may each provide content to a rendering service 223. As shown, the content sources may provide static content and/or animated content to the rendering service. As shown, the rendering service 223 may generate rendered display frames that include some or all of the content from the content sources, for display by a display 225. As shown, the display 225 may output displayed frames (e.g., by operating an array of display pixels to display frame pixels of each rendered display frame).

One or more applications, such as application 202, and/or one or more system processes, such as system processes 204, may each provide animated content including one or more animations for display by the display. In some use cases, multiple animations from multiple animation sources (e.g., multiple animations from an application, one animation from multiple animations, multiple animations from a system process and/or one animation from multiple system processes) may be provided for concurrent display by the display 225.

Figure 3:
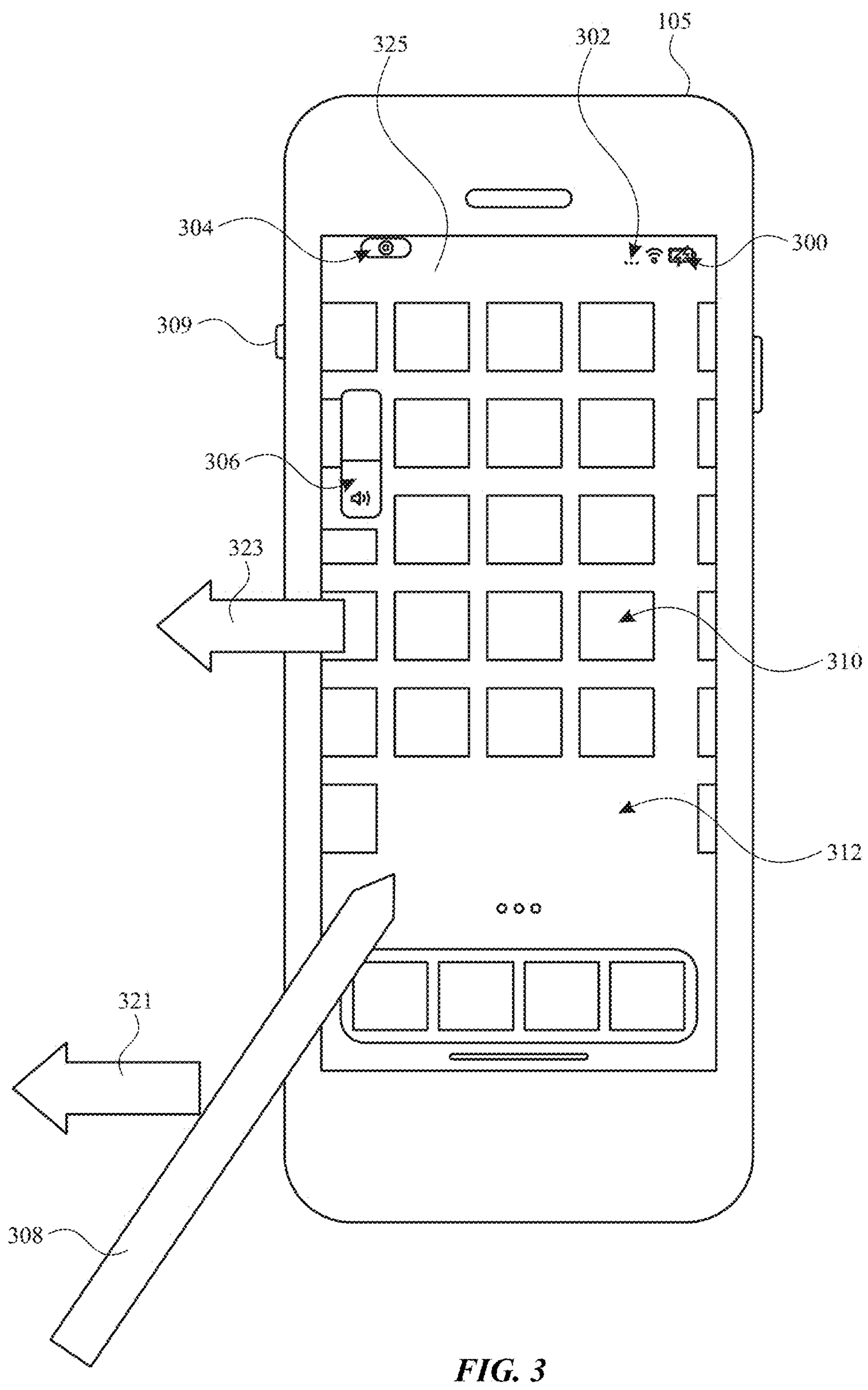
FIG. 3 illustrates an example of a computing device displaying multiple animations in accordance with one or more implementations.

For example, FIG. 3 illustrates a use case in which the electronic device 105 is implemented as a smartphone or a tablet device, and the display 225 of the electronic device displays a home screen including static content and multiple concurrent animations. In this example, the display 225 concurrently displays a background 312, multiple icons 310 (e.g., application icons), a battery indicator 300, a process indicator 304, a button press indicator such as volume indicator 306 resulting from a press of a volume button 309, and a signal strength indicator 302, at a time when an user input (e.g., from an input source such as a stylus 308 as indicated by arrow 321) has caused a scrolling animation of the icons 310 in the direction indicated by the arrow 323 (e.g., a scrolling action from one home screen of the device to a next home screen of the device).

In this example, the background 312 is static content from a system process such as system processes 204. In this example, the battery indicator 300, the signal strength indicator 302, the volume indicator 306, and the scrolling animation of the icons 310 are animations from the system processes 204. In this example, the process indicator 304 is an animation from an application 202. The scrolling animation of FIG. 3 is merely illustrative and other scrolling animations can be provided, such as when a user interface (UI) of a system process or an applications displays a vertical or horizontal scrollable list (e.g., in an dropdown menu) and the user inputs a swipe or other input to cause scrolling of the list.

Each of the animation sources (e.g., the system processes 204 and the application 202) may have limitations and/or preferences with which the corresponding animations can be generated by that source. For example, a particular animation source may have a preferred frame rate for a particular animation, a minimum frame rate for the particular animation, and/or a maximum frame rate for the particular animation. For example, the preferred frame rate for a particular animation may be a frame rate at which the animation has an optimal appearance on the display 225, a minimum frame rate for the particular animation may be a frame rate below which optical artifacts such as glitches or blur may be perceptible on the display, and a maximum frame rate for the particular animation may be the maximum frame rate at which the animation source is able to generate frames for the particular animation (e.g., due to the time used by other processing operations that are performed to generate the frames). In the example of a scrolling animation, depending of the speed of the scrolling input, a frame rate may be used that is faster than a rate at which a human eye can distinguish between a low refresh rate and high refresh rate. Because a scrolling animation can occur at different scrolling speeds (e.g., based on the speed of the input swipe or gesture), and/or can be slowed over time to mimic a physical scroll, a scrolling animation source may determine a preferred, minimum, and/or maximum frame rate at a given time during the scroll by: receiving a scrolling input and applying the scrolling input to a model (e.g., a human perception model) to obtain the frame rate parameters. For example, the scrolling animation may obtain a speed of the scrolling input, and extract a frame rate that corresponds to that scrolling input from the human perception model as a preferred frame rate or a minimum frame rate. For example, the human perception model may map a scrolling speed to a minimum frame rate below which frame transitions would be perceptible to a typical human.

Moreover, the display 225 itself may have a native refresh rate. For example, a native refresh rate of display 225 may be a rate at which the pixels of the display are periodically refreshed (e.g., responsive to a vertical synchronization (VSYNC) signal), and may be determined by a display manufacturer or device manufacturer. In various implementations, the native refresh rate of display 225 may be 50 Hertz (Hz), 60 Hz, 120 Hz, 240 HZ, or higher than 240 Hz. In one or more implementations, the multiple animations shown in FIG. 3 may be generated at a frame rate that is compatible with (e.g., that is an even factor of) the native refresh rate of the display.

However, requiring animations to be generated at only an even factor of the native refresh rate can cause animations to be generated with a frame rate that is undesirable for animation quality and/or other source preferences or settings, and can also lead to an inefficient use of device power. For example, the refresh rate of a display may be substantially proportional to the power consumption of the display; the higher the refresh rate, the more power the display will consume. As such, it may be desirable to be able to adjust the refresh rate of the display. However, modifying the refresh rate of the display when multiple animation sources are providing multiple animations for display can lead to frame rate incompatibilities that can cause visible artifacts that may be undesirable.

For example, in one or more implementations, such as an implementation in which a display has a fixed native refresh rate, a display may have a native refresh rate of X Hz, and a frame can be presented at any 1/X-second heartbeat and can be maintained on the display for at least 1/X seconds. In this example, an animation can run smoothly at Y Hz, for all Y that are factors of X. For example, the factors of 60 are {1, 2, 3, 4, 5, 6, 10, 12, 15, 20, 30, 60}. Thus, on a 60 Hz native refresh rate display, an animation can run at a frame rate of 30 Hz by skipping every other 60 Hz frame, at a frame rate of 20 Hz by skipping every two 60 Hz frames, and so on. In this example, animations with different frame rates Y, where Y is a factor of X, can coexist without causing glitches.

For example, FIG. 4 illustrates a timing diagram of a 60 Hz native refresh rate display having a 1/60 Hz heartbeat, in which a first animation is provided with a 20 Hz frame rate, a second animation is compatibly provided at a 60 Hz frame rate, and display frames are compatibly rendered for display (e.g., by rendering service 223) at various display heartbeats.

In one or more implementations, a display, such as a variable refresh rate display, may have the ability to present a frame at any 1/X-second heartbeat, and may maintain a presented frame on the display for at least two heartbeats. In such an implementation, since the effective maximum frame rate for the display corresponds to an interval of two heartbeats (e.g., 2/X seconds), the display may be referred to herein as a X/2 Hz native refresh rate display (e.g., even though, in one or more implementations, the current refresh rate of the display can be variable or changeable from the native (maximum) refresh rate, such as to refresh rate of X/3 Hz, X/4 Hz, X/5 Hz, X/6 Hz, or X/8 Hz).

For example, FIG. 5 illustrates a timing diagram of a 120 Hz native refresh rate display (e.g., a variable refresh rate display) having a 1/240 Hz (4.17 ms) heartbeat, in which a 120 Hz animation is provided and rendered for display at a rate of 120 Hz. In the example of FIG. 5, a display frame can be presented at any heartbeat and can be maintained on the display for at least two heartbeats. In other words, in this example, a frame can be presented at any 4.17 ms heartbeat and can be maintained on the display for 8.33 ms. Hence, the example of FIG. 5, the highest frame rate is 120 Hz. In one or more implementations, lower frame rates can be achieved by presenting a frame once every a few heartbeats, e.g. 60 Hz frames can be presented every four heartbeats (e.g., 16.67 ms in this example), 40 Hz frames can be presented every six heartbeats (e.g., every 25 ms), and so on. In these examples, the frame rates are all factors of 120 that have even number of heartbeats, and can be referred to as "even-quanta" frame rates in some examples.

The 120 Hz native refresh rate display of this example does not disallow "odd-quanta" frame rates (e.g., an 80 Hz frame rate or a 48 Hz frame rate that present a frame every three or five heartbeats, respectively), and such "odd-quanta" frame rates can be beneficial in terms of both display appearance and power consumption. For example, 80 Hz (see, e.g., FIG. 6) can serve as an intermediate frame rate when transitioning between a 60 Hz frame rate and a 120 Hz frame rate (or vice versa). Using an intermediate frame rate during frame rate transitions can help with the visible appearance of animations on the display during the frame rate transitions. As another example, 48 Hz frame rates and 80 Hz frame rates can sometimes be used instead of 60 Hz frame rates and 120 Hz frame rates, respectively, to achieve similar display quality with reduced power consumption. For example, a 48 Hz frame rate can be used near the end of a scrolling animation that is displayed at 60 Hz and decelerating, to reduce the power consumption without affecting the on-screen quality of the scrolling animation. Thus, 48 Hz frame rates and 80 Hz frame rates can provide not only visual quality advantages, but also opportunities for power savings to enable more high visibility use cases to run in 120 Hz.

However, "odd-quanta" frame rates are not only incompatible with each other, but also incompatible with "even-quanta" frame rates. Incompatibility of frame rates causes frame glitches and uneven frame cadences when animations are concurrently displayed, which can degrade the user experience and outweigh the benefits of these "odd-quanta" frame rates described above. For example, FIG. 7 illustrates an example timing diagram of concurrent 120 Hz and 80 Hz animations, on a 120 Hz native frame rate display having a 4.17 ms (i.e., 1/240 Hz) heartbeat.

In the example of FIG. 7, each time an animation requires an evaluation, a frame should be produced at that specific time. However, at a time 702, a frame cannot be rendered for the 80 Hz animation because a frame has just been displayed by the display 4.17 ms prior at a time 700. Thus, in this example, only when a frame is displayed at time 704 does the 80 Hz animation cause a visual update on the display, which results in a long-short-long-short judder cadence, instead of a smooth 80 Hz animation.

In accordance with one or more implementations, frame rate arbitration operations can be performed to provide frame rate compatibility of all animation sources. Frame rate arbitration can help maintain a deterministic behavior in the transitions among different frame rates. The frame rate arbitration operations described herein can facilitate making "odd-quanta" frame rates available on a display such as display 225 (e.g., a 120 Hz native frame rate display having 1/240 Hz heartbeat), without incurring visual glitches that may degrade the user visual experience.

Figure 8:
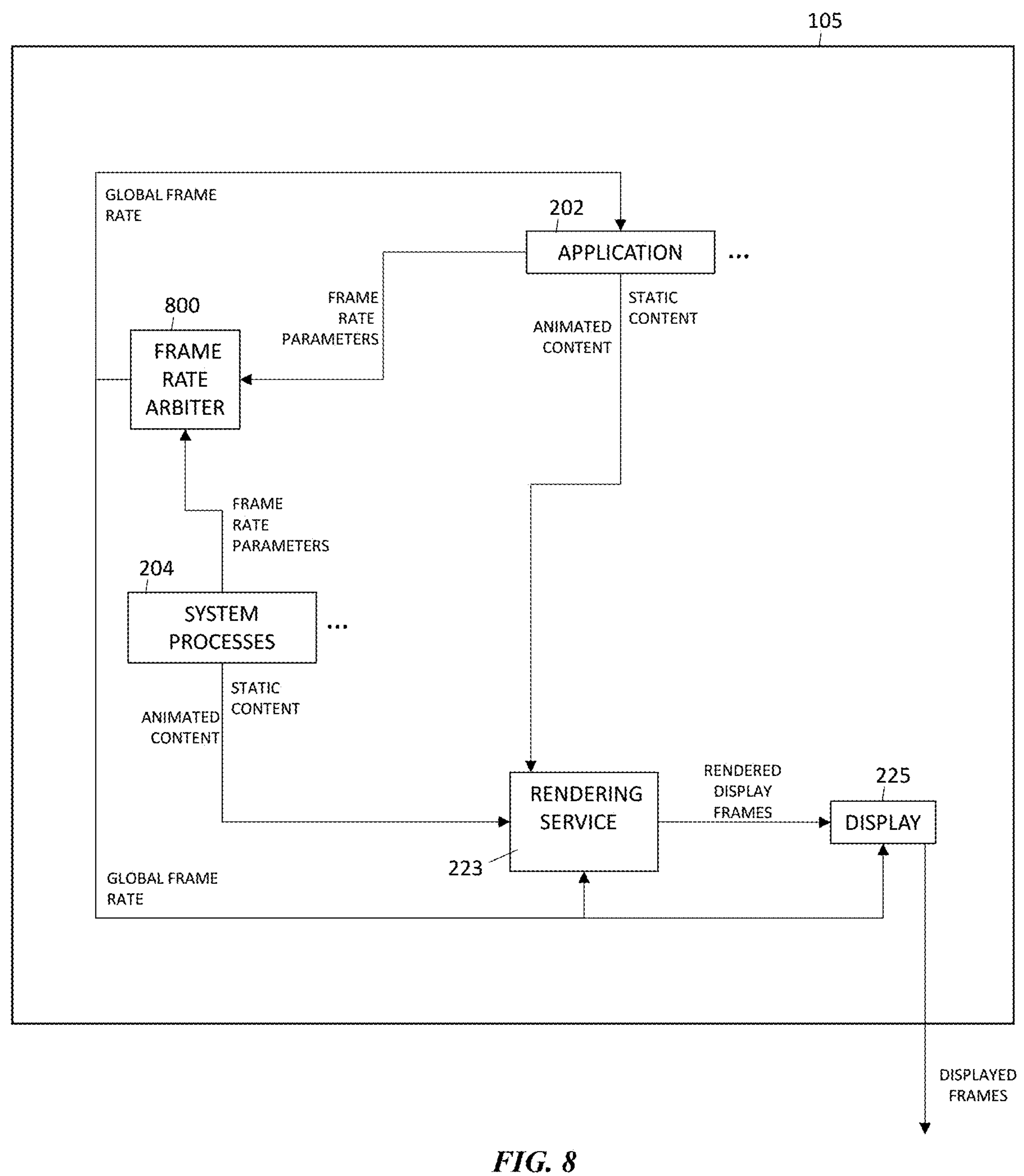
FIG. 8 illustrates a schematic diagram of another example computing device that may implement aspects of the subject technology.

FIG. 8 illustrates an example architecture having a frame rate arbiter, that may be implemented by the electronic device 105 in accordance with one or more implementations of the subject technology. For explanatory purposes, the architecture of FIG. 8 is described as being implemented by the electronic device 105 of FIG. 1, such as by a processor and/or memory of the electronic device; however, the architecture may be implemented by any other electronic device, including the electronic device 104, the electronic device 110, electronic device 115, and/or server 120. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

Various portions of the architecture of FIG. 8 can be implemented in software or hardware, including by one or more processors and a memory device containing instructions, which when executed by the processor cause the processor to perform the operations described herein. In the example of FIG. 8, the electronic device 105 includes a frame rate arbiter 800. In the example of FIG. 8, the frame rate arbiter 800 is illustrated as a separate entity from the rendering service 223. However, in the frame rate arbiter 800 may be provided as an element of the rendering service 223.

As shown in FIG. 8, animation sources such as the application 202 and the system processes 204 may provide frame rate parameters to the frame rate arbiter 800. The frame rate arbiter 800 may determine a global frame rate based on the frame rate parameters for the animation sources, and notify the animation sources of the global frame rate. In one or more implementations, the frame rate arbiter 800 may also notify the rendering service 223 of the global frame rate. In one or more implementations, the rendering service 223 may render display frames and provide the rendered display frames to the display 225 at the global frame rate. In one or more implementations, the frame rate arbiter 800 may also notify the display 225 of the global frame rate. In one or more implementations, the display 225 may modify the refresh rate of the display to match the global frame rate from the frame rate arbiter 800.

The frame rate parameters for each animation may include, as examples, a minimum frame rate, a maximum frame rate, and/or a preferred frame rate. The minimum frame rate and the maximum frame rate may define a frame rate range for the animation source. After the animation sources have been notified of the global frame rate, the animation sources can provide content (e.g., frames and/or content for generating frames) to the rendering service 223 at the global frame rate and/or at a compatible frame rate that is a factor (e.g., an even-quanta factor) of the global frame rate. For example, for a global frame rate of 120 Hz, one or more animation sources can provide 60 Hz display frames or 30 Hz display frames, instead of a providing the frames at global frame rate of 120 Hz. However, animation sources may be disallowed from providing odd-quanta factors, such as 80 Hz frames, when the global frame rate is 120 Hz, even if 80 Hz is the preferred frame rate for the second animation source.

In one or more implementations, an animation source (e.g., an application 202, system processes 204, and/or one or more processes of rendering service 223) may register, update, and/or unregister frame rate parameters (e.g., including a frame rate range) to the frame rate arbiter 800. The frame rate arbiter 800 may record the registered and/or modified frame rate parameters and, based on all active frame rate parameter registrations, the frame rate arbiter 800 may determine the global frame rate at which the rendering service 223 will be generating rendered display frames. The animation sources may then receive the global frame rate from the frame rate arbiter 800, and adapt to a frame rate that is compatible with the global frame rate.

An animation source can be a client-driven source (e.g., an application 202 and/or a system process 204) that relies on timing information from the rendering service 223 to generate animated content, or an animation source that is owned by the rendering service 223 itself. For example, client-driven animation sources may require the source (e.g., an application 202) to evaluate the state of its animation at each time-step indicated by the rendering service 223, and submit any changes to the animation at that time step, whereas an animation source that is owned by the rendering service 223 is fully managed by the rendering service.

In one or more implementations, the frame rate parameters for an application source may be determined by a developer of the animation source, and may be fixed parameters. In one or more other implementations, frame rate arbitration processes can also be performed at a client-side source to determine the frame rate parameters for that source. For example, FIG. 9 illustrates an example in which the frame rate arbiter 800 of FIG. 8 is implemented as a process of the rendering service 223 that also includes an animation source 910, and in which additional frame rate arbiters 907 are provided for the application 202 and a system process 921 (e.g., a system process of system processes 204).

In this example, the frame rate arbiter 907 of the application 202 computes frame rate parameters 900 (e.g., a frame rate range, a minimum frame rate, a maximum frame rate, and/or a preferred frame rate) based on timing information 908 for one or more animations generated by the application 202. In one or more implementations, a preferred frame rate for an animation source may be the same as the minimum frame rate, the same as the maximum frame rate, and/or a frame rate that is between the minimum frame rate and the maximum frame rate (e.g., within the frame rate range) for that animation. As shown in FIG. 9, the application 202 can then register, update, and/or unregister the frame rate parameters 900 with the frame rate arbiter 800.

Figure 9:
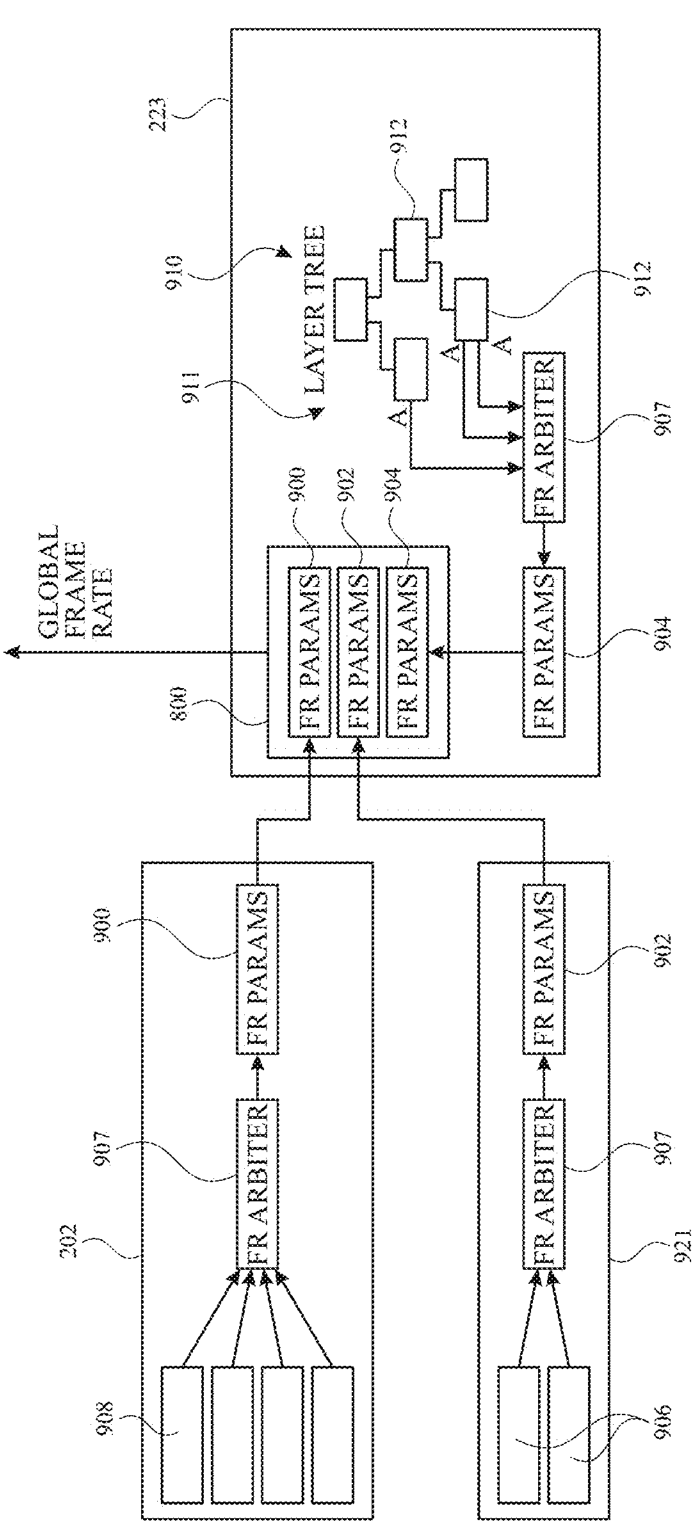
FIG. 9 illustrates a schematic diagram of additional features that may be included in a computing device that may implement aspects of the subject technology.

In the example of FIG. 9, the frame rate arbiter 907 of the system process 921 also computes frame rate parameters 902 (e.g., a frame rate range, a minimum frame rate, a maximum frame rate, and/or a preferred frame rate) based on timing information 906 for one or more animations generated by the system process 921. As shown in FIG. 9, the system process 921 can then register, update, and/or unregister the frame rate parameters 902 with the frame rate arbiter 800.

In the example of FIG. 9, the animation source 910 that is owned by the rendering service 223 provides a layer tree 911 that describes how the rendering service 223 is to render content. In this example, active animations "A" at one or more layers 912 of the layer trec 911 may be accumulated each time the rendering service 223 walks the layer tree when preparing a render, and an additional frame rate arbiter 907 of the rendering service may generate frame rate parameters 904 (e.g., a frame rate range, a minimum frame rate, a maximum frame rate, and/or a preferred frame rate) based on frame rate preferences and/or animation characteristics (e.g., the speed of a moving edge of an animated feature) for the various active animations "A".

As indicated in FIG. 9, the frame rate arbiter 800 may record frame rate parameters from one or more animation sources (e.g., including the frame rate parameters 900 from application 202, the frame rate parameters 902 from system process 921, and the frame rate parameters 904 from the animation source 910 of the rendering service 223). The recorded frame rate parameters may be stored by the frame rate arbiter 800 (e.g., by the rendering service 223) and used to determine a global frame rate. Upon receiving changes to any of the recorded frame rate parameters from any of the animation sources, the frame rate arbiter 800 may compute an update to the global frame rate, as described in further detail hereinafter (e.g., in connection with FIGS. 12A-12H).

In one or more implementations, as part of the process for determining a global frame rate from the frame rate parameters 900, the frame rate parameters 902, and the frame rate parameters 904, the frame rate arbiter 800 may convert the recorded frame rate parameters for each animation source to frame interval parameters. The frame interval parameters may be hardware dependent. For example, a frame rate of 120 Hz may be converted to a frame interval of two for a 120 HZ display on which each display frame is maintained on the display for two heartbeats. In one or more implementations, frame interval ranges may be obtained (e.g., ranges between a maximum frame interval corresponding to a minimum frame rate, and a minimum frame interval corresponding to a maximum frame rate). In one or more implementations, the frame rate arbiter 800 may augment the frame interval ranges (e.g., by expanding the ranges to accommodate other device and/or display settings or requirements that are independent of the animation sources).

In one or more implementations, the frame rate arbiter 800 may sort the frame interval ranges for the various animation sources. In one or more implementations, the frame rate arbiter 800 may perform an intersection of the (e.g., sorted) frame interval ranges, until the next intersection in the intersection operation would lead to an empty range. In one or more implementations, the frame rate arbiter 800 may select, from within the frame interval range resulting from the intersection operation (e.g., the last range before the intersection operation resulted in an empty range), the smallest frame interval that matches a preferred frame interval corresponding to one of the recorded frame rate parameters, as a global frame interval. In a case in which no animation sources provided a preferred frame rate (and correspondingly a preferred interval) and/or in which no preferred interval is within the range, the frame rate arbiter may select a device-preferred frame interval (e.g., an interval of four corresponding to a 60 Hz frame rate in some implementations) as the global frame interval, if the device-preferred interval is within or below the range resulting from the intersection. If the device-preferred frame interval does not fall within the frame interval range resulting from the intersection and the device-preferred frame rate is greater than the highest interval in the range, the frame rate arbiter 800 may select, as the global frame interval, the largest interval within the frame interval range. In one or more other implementations, the frame rate arbiter 800 may select the smaller of this largest interval within the frame interval range and an interval of five (corresponding to a 48 Hz frame rate in some implementations), as the global frame interval.

In one or more implementations, the global frame interval may be shared (e.g., and/or converted to a global frame rate and shared) by the frame rate arbiter 800 with all animation sources (e.g., via a read-only shared memory). Once the global frame rate has been distributed, client-driven animation sources may update their frame rate to a compatible frame rate at the upcoming VSYNC at which the applications are scheduled to run.

This update by the animation source(s) may be performed differently depending on whether a preferred frame rate has been specified by the animation source(s) For example, when an animation source receives a global frame rate, if a preferred frame rate is specified for that animation source, the compatible frame rate selected by the animation source may be the frame rate that is less than the global frame rate, within the frame rate range for the animation source (e.g., between the minimum frame rate and the maximum frame rate), and closest to the preferred frame rate. In a scenario in which the animation source does not have a preferred frame rate, the compatible frame rate selected by the animation source may be the frame rate that is less than the global frame rate, within the frame rate range for the animation source (e.g., between the minimum frame rate and the maximum frame rate), and closest to global frame rate. In one or more implementations, server-side animation sources, such as an animation source 910 that provides a layer tree 911 to the rendering service 223, may be updated in the same fashion when layer tree travel is completed at before each render.

Figure 10:
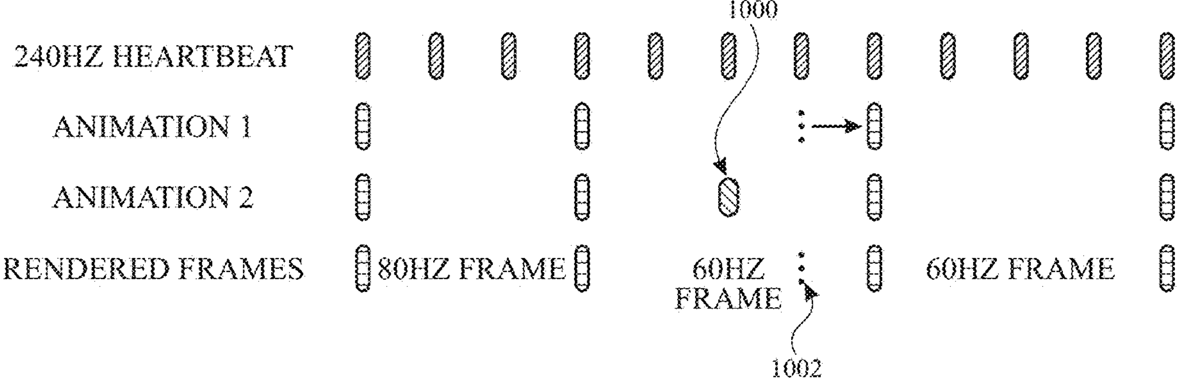
FIG. 10 illustrates a timing diagram illustrating aspects of an immediate frame rate transition.

In one or more implementations, frame rate arbitration can be performed by the frame rate arbiter 800 at any point in time. However, animation sources can only be updated when they wake up at a scheduled VSYNC time. Accordingly, the entire system may be unable to instantaneously transition to a different frame rate without exposing the system to, e.g., race conditions. For example, in a use case in which all animation sources are operating at 60 Hz and have started working on a frame to be committed to the rendering service 223 in 16.67 ms, one animation source may request an update to an 80 Hz frame rate. In this example use case, if the rendering service 223 were to transition immediately to an 80 Hz frame rate, then some animation sources would be targeting providing a frame in 16.67 ms and some animation would be targeting providing a frame 12.5 ms. However, all of these frames would be displayed at the same time, resulting in visual glitches. FIG. 10 illustrates another such use case in which a frame rate transition occurs immediately. In the example of FIG. 10, two animations (e.g., “Animation 1” and “Animation 2”) are generating 80 Hz frames that are rendered at 80 Hz. Then, at a time 1000, Animation 2 provides updated frame rate parameters that result in a global frame rate change from 80 Hz to 60 Hz. As shown in FIG. 10, in a use case in which the electronic device (e.g., the rendering service 223) were to immediately switch to the new 60 Hz global frame rate (e.g., without the frame rate transition scheduling discussed hereinafter), only the animation source for Animation 2 would be aware of the change and be able to act upon the change to target a different heartbeat. In this scenario, Animation 1 may have already completed its next frame or that was previously scheduled to be presented at time 1002 and won’t have sufficient time to redo its work for the new timing, or may still be in the process of doing its work and unable to change to a new target heartbeat. As shown in FIG. 10, in this scenario, the next frame for Animation 1 will be presented on the display one heartbeat later than intended, which would produce a similar undesirable effect as discussed above in connection with the incompatible frame rates illustrated by FIG. 7.

Figure 11A:
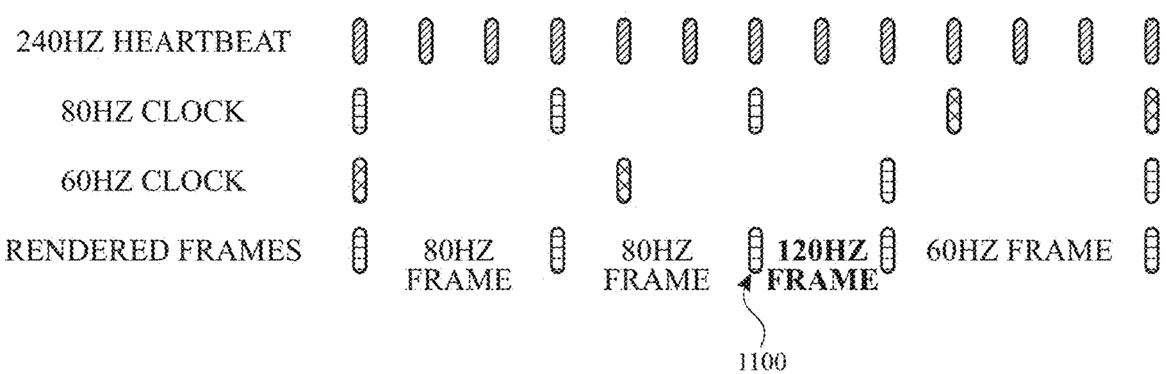
FIGS. 11A and 11B show timing diagrams illustrating aspects of phase offsets that can occur before and after frame rate transitions.
Figure 11B:
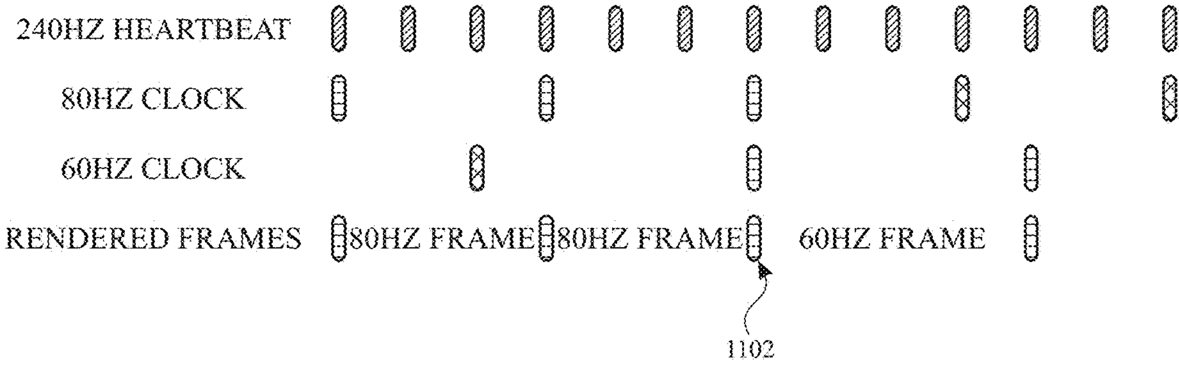

FIGS. 11A and 11B illustrate another use case in which a frame rate transition can result in a visual glitch due, in this use case, to the relative phases of the rates before and after the transition. In the example of FIG. 11A, a frame rate transition from 80 Hz to 60 Hz occurs at a time 1100 with an unexpected frame length. In the example of FIG. 11B, a frame rate transition from 80 Hz to 60 Hz occurs at a time 1102 with the 60 Hz frame length. In both of FIGS. 11A and 11B, even though an animation source may be notified in advance of the transition that the frame rate will change, and can provide a frame for display with the updated timing, the phase offsets of the frame rates before and after the transition can result in a change in a blur radius or motion blur width, causing what appears to be a glitch to the human eye.

In accordance with aspects of the subject technology, the rendering service 223 can also provide for frame rate transition scheduling, in which a frame rate transition is scheduled in advance to occur at the next VSYNC time. This frame rate transition scheduling can help ensure that animation sources that are running at the same frame rate as the rendering service 223 (e.g., the global frame rate) can rely on a previously received timing guarantee in the current frame (e.g., addressing the immediate transition issue discussed above and illustrated in FIG. 10). Animation sources running at frame rates lower than the frame rate of the rendering service 223 (e.g., the global frame rate) may receive different frame times during the transition. The frame rate transition scheduling also helps ensure that the before and after phases result in a common VSYNC at the transition (e.g., addressing the issue illustrated in FIGS. 11A and 11B).

In accordance with one or more implementations, frame rate transition scheduling may include receiving changes to frame rate parameters from one or more animation sources prior to a next VSYNC time, and determining and providing a resulting updated global frame to take effect following the next VSYNC time. FIGS. 12A-12H illustrate an implementation of frame rate arbitration with frame rate transition scheduling. In the example of FIGS. 12A-12H, a current time 1200 that is occurring “now” in that figure is indicated with a vertical line moving to the right progressing from FIG. 12A to FIG. 12H.

Figure 12A:
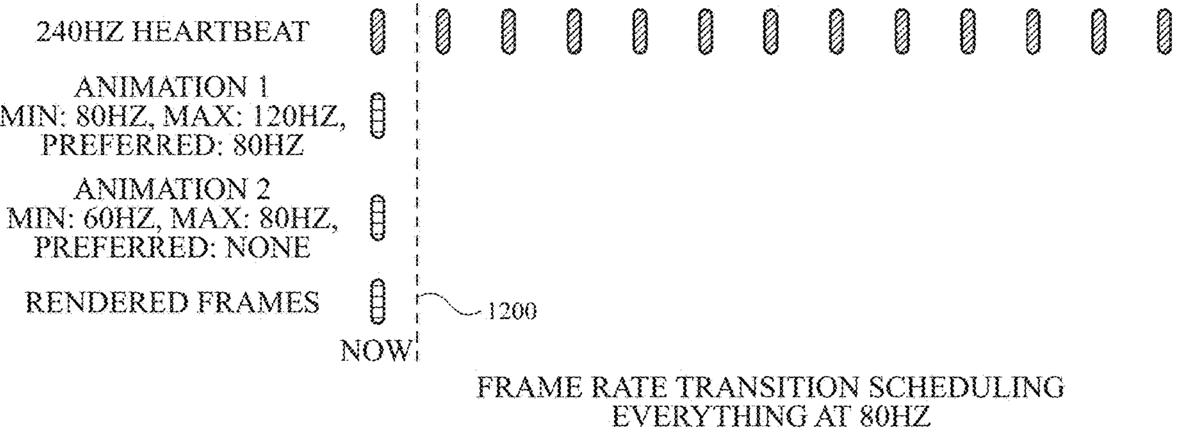
FIGS. 12A-12H show timing diagrams illustrating operation of an electronic device to display multiple animations using frame rate arbitration in accordance with one or more implementations.
Figure 12B:
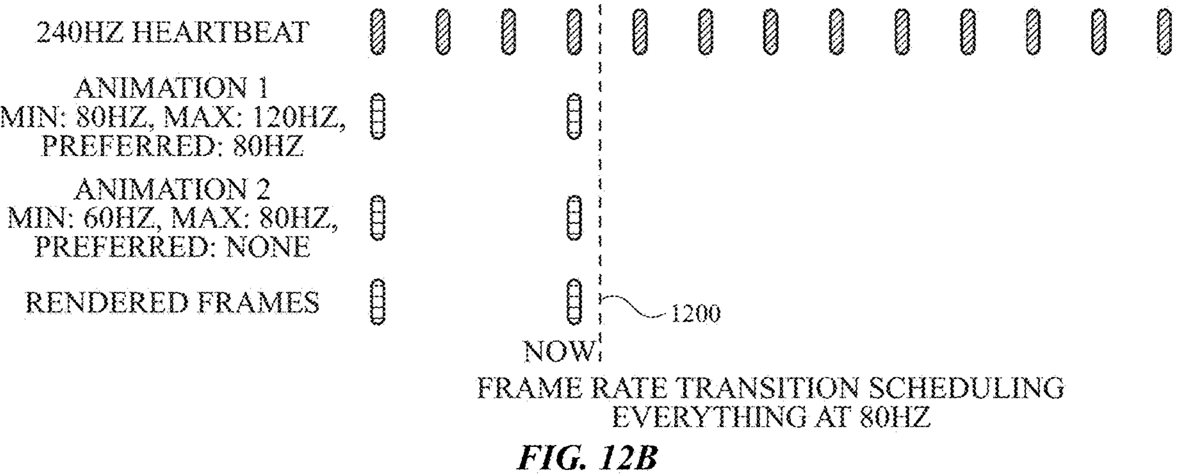

For example, FIG. 12A illustrates a timing diagram in which two animations (“Animation 1” and “Animation 2”) provide animations at an 80 Hz frame rate that is displayed on a display having a 240 Hz heartbeat. In FIG. 12B, Animation 1 and Animation 2 both provide a next 80 Hz frame that is displayed at the expected 80 Hz frame rate. In this example, the global 80 Hz frame rate has been determined (e.g., by a frame rate arbiter 800) based on frame rate parameters for Animation 1 of an 80 Hz minimum frame rate, a 120 Hz maximum frame rate, and an 80 Hz preferred frame rate, and frame rate parameters for Animation 2 of a 60 Hz minimum frame rate, an 80 Hz maximum frame rate, and no preferred frame rate. In this example, because the 80 Hz preferred frame rate of Animation 1 is within the range defined by the 60 Hz minimum frame rate and the 80 Hz maximum frame rate of Animation 2, the global frame rate can be set to the 80 Hz preferred frame rate for Animation 1, and both Animation 1 and Animation 2 can generate frames at the global frame rate.

Figure 12C:
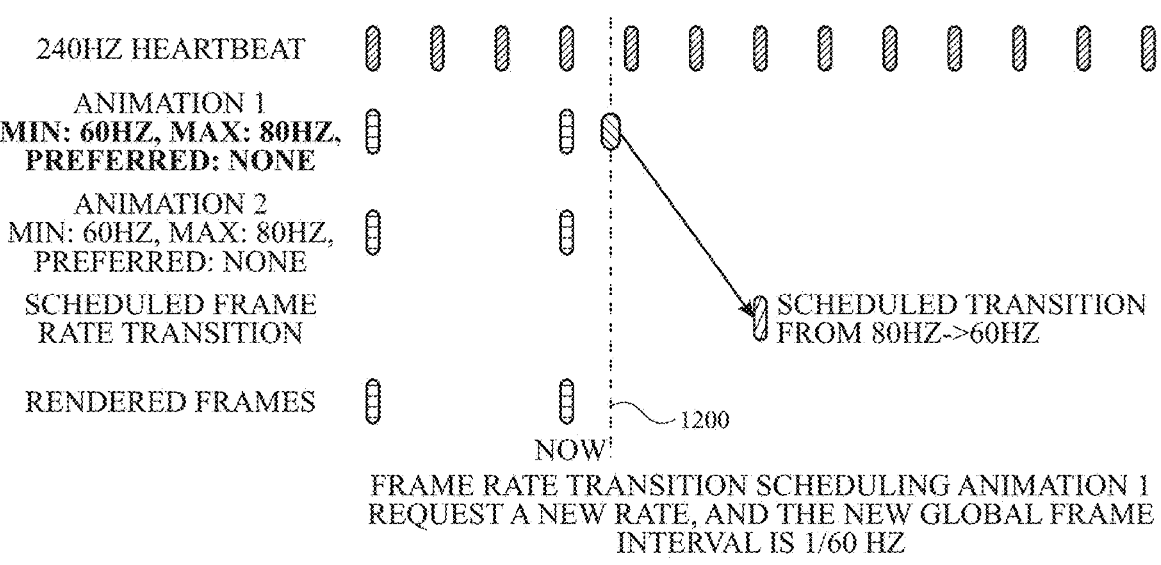

As shown in FIG. 12C, Animation 1 may modify its frame rate parameters to remove the preferred frame rate, and reduce the minimum frame rate to 60 Hz and the maximum frame rate to 80 Hz, following the rendered frame of FIG. 12B. In this example, the minimum frame rate that is within the frame rate ranges of both Animation 1 and Animation 2 (e.g., 60 Hz) may be determined as a new global frame rate. As shown, to provide frame rate transition scheduling, a frame rate transition to the updated global frame rate of 60 Hz may be scheduled to occur at the next 80 Hz VSYNC time. In this way, the 80 Hz frames that are already being generated by Animation 1 and Animation 2 for the next 80

Hz VSYNC time can be displayed, as expected by the animation sources, before the transition occurs.

Figure 12D:
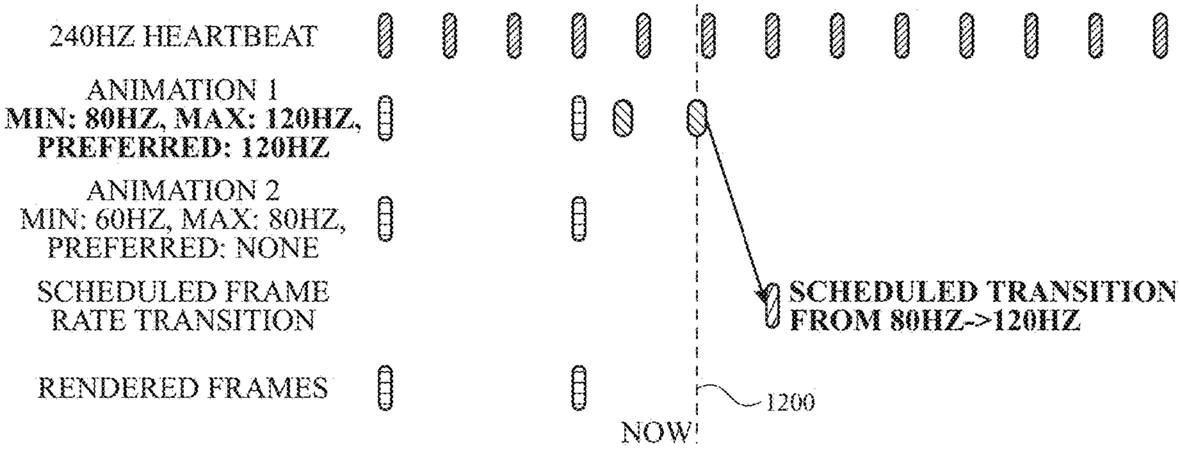
Figure 12E:
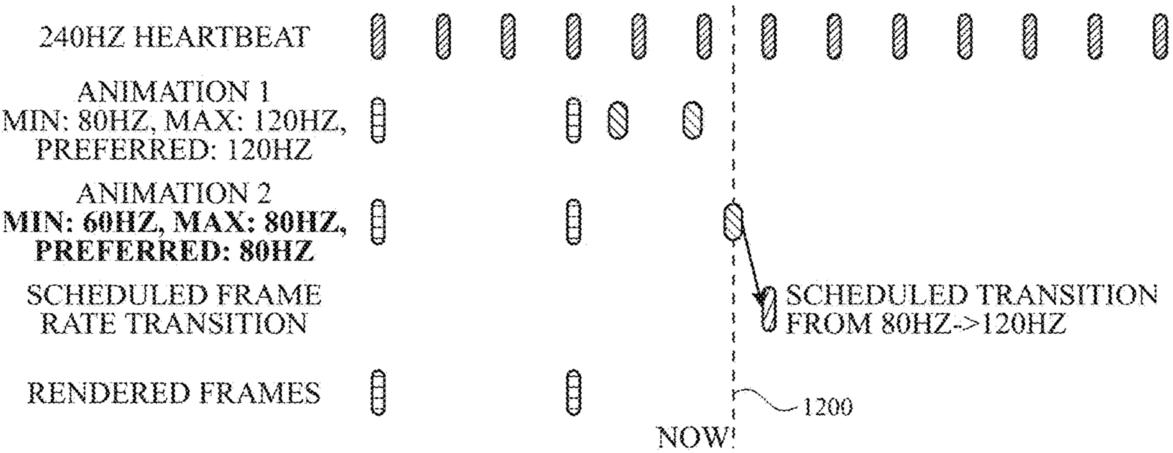

As illustrated in FIGS. 12D and 12E, because the transition does not occur until the next 80 Hz VSYNC time, additional frame rate parameter updates and associated global frame rate updates can occur before the transition is in effect. In the example of FIG. 12D, Animation 1 provides a new preferred frame rate of 120 Hz and raises the minimum frame rate and maximum frame rate to 80 Hz and 120 Hz respectively, and a new updated global frame rate of 120 Hz (e.g., the highest preferred frame rate) is determined. As shown, a transition from the current 80 Hz frame rate to the new updated global frame rate of 120 Hz is scheduled in place of the prior 80 Hz to 60 Hz transition at the next VSYNC time. In the example of FIG. 12E, still prior to the next VSYNC time at which the 80 Hz to 120 Hz transition is scheduled, Animation 2 updates its frame rate parameters to provide a common 80 Hz frame rate as the preferred frame rate and the maximum frame rate, and a 60 Hz minimum frame rate. In this example, the higher of the preferred frame rates may be selected as the new global frame rate (e.g., still 120 Hz in this example), and the scheduled transition from 80 Hz to 120 Hz may be maintained for the next VSYNC time.

Figure 12F:
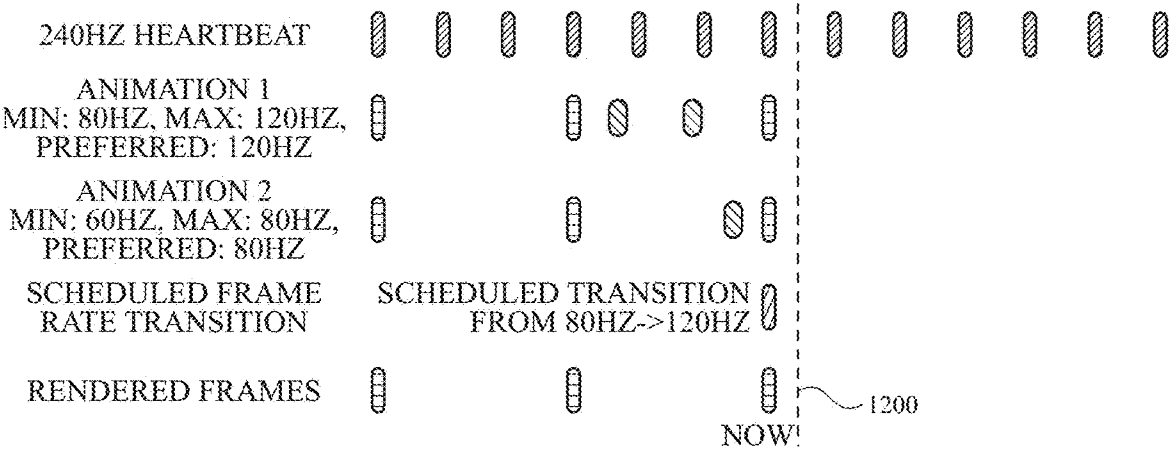

As shown in FIG. 12F, Animation 1 and Animation 2 can both provide the upcoming 80 Hz frames and have them displayed at the next 80 Hz VSYNC time, and be informed at that time of the new global frame rate that will be used going forward from that VSYNC time.

In one or more implementations, a frame rate transition timestamp for a scheduled frame rate transition may be shared with one or more animation sources along with the updated global frame rate (e.g., via a read-only shared memory). When an animation obtains a frame rate transition timestamp, the animation may selectively use the existing global frame interval or the upcoming updated global frame interval based on the transition timestamp and depending on the operations of the animation source. In this way, aspects of the subject technology allow for timing calculations to be well defined for all animation sources both before and after a frame rate transition.

Figure 12G:
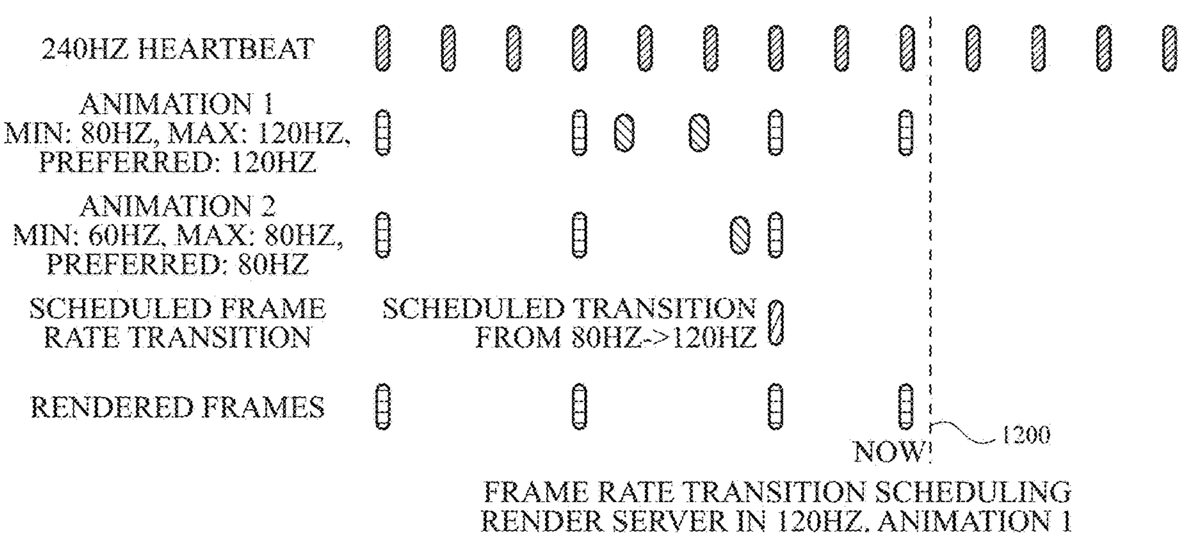
Figure 12H:
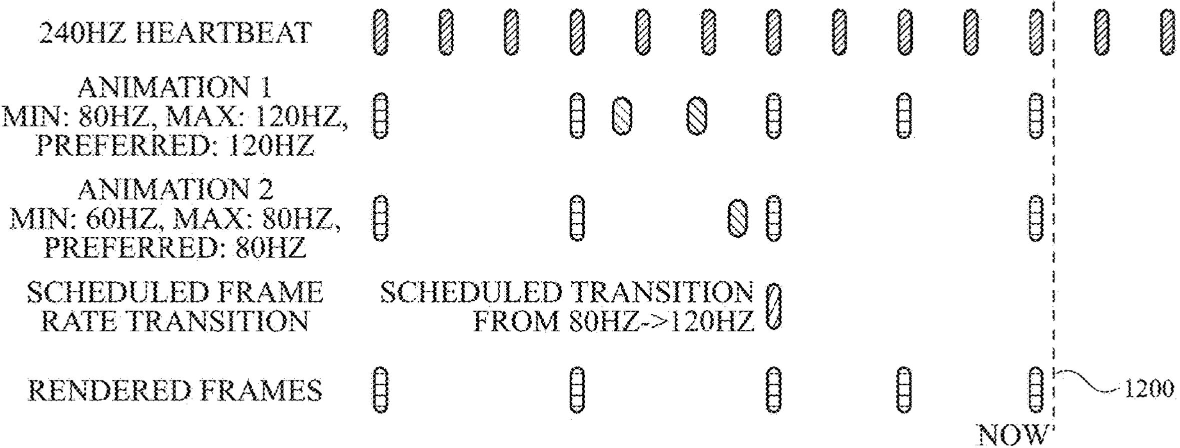

For example, as shown in FIGS. 12G and 12H, Animation 1 may generate frames at the new global frame rate of 120 Hz and have the frames displayed at the global frame rate of 120 Hz, and (e.g., because the global frame rate of 120 Hz is outside the frame rate range of Animation 2) Animation 2 can generate frames at a compatible frame rate of 60 Hz for display every other 120 Hz VSYNC time. As shown, the frame rate arbitration operations described herein can allow a display with a 240 Hz heartbeat to support frame rates that are even-quanta frame rates of the native refresh rate and odd-quant frame rates of the native refresh rate, at various times.

In this way, the rendering service 223 and the frame rate arbiter 800 can provide frame rate arbitration operations that provide compatibility of frame rates for multiple concurrent animations within a display system, and reduce and/or eliminates glitches that may arise at frame rate transition boundaries.

The example of FIGS. 12A-12H are described in connection with two animations, Animation 1 and Animation 2. It is also appreciated that in other examples, one or more additional animations can provide frame rate parameters and receive and adjust to updated global frame rates as described in connection with FIGS. 12A-12H. It is also appreciated that one or more input sources can also provide frame rate parameters to the frame rate arbiter 800 in one or more implementations. For example, input sources such as a stylus, an array of touch-sensitive electrodes of a touch surface or touch screen, a mouse, a pointer, a keyboard, a camera, etc. can obtain input events at a frame rate. In some use cases, inputs received by the input sources can be inputs associated with displayed content. Accordingly, it can be desirable to synchronize and/or otherwise coordinate input events with displayed content. In one or more implementations, an input source may provide frame rate parameters, such as a preferred, minimum, and/or maximum frame rates, to the frame rate arbiter 800, and the frame rate arbiter 800 may include the frame rate parameters received from the input source in the frame rate arbitration process as described herein in connection with animation sources. The frame rate arbiter and/or another process at the electronic device 105 can provide a global frame rate resulting from the frame rate arbitration process to the input source. The input source can then adjust the input event frame rate to a compatible frame rate with the global frame rate, in one or more implementations. In one or more implementations, such as when an input source is unable to generate input events at a frame rate that is as high as the global frame rate or when the global frame rate is an odd-quanta factor of the frame rate at which the input source generates input events, the input source or the electronic device 105 may interpolate between input events to generate estimated input events for each frame at which display frames are generated and/or displayed. For example, the input source may generate the estimated (interpolated) input events and provide the estimated input events to the electronic device 105, or the electronic device 105 may perform the interpolation of received input events from the input source and generate the estimated input events at the electronic device 105.

FIG. 13 illustrates a flow diagram of an example process for performing display frame rate arbitration according to aspects of the subject technology. For explanatory purposes, the process 1300 is primarily described herein with reference to the electronic device 105 of FIGS. 1 and 8. However, the process 1300 is not limited to the electronic device 105 of FIGS. 1 and 8, and one or more blocks (or operations) of the process 1300 may be performed by one or more other suitable devices. The blocks of process 1300 are described herein as occurring in serial, or linearly. However, multiple blocks of process 1300 may occur in parallel. In addition, the blocks of process 1300 need not be performed in the order shown and/or one or more blocks of process 1300 need not be performed and/or can be replaced by other operations.

In the example of FIG. 13, at block 1302, the process 1300 includes recording (e.g., by an electronic device such as electronic device 104, electronic device 105, electronic device 110, electronic device 115, or another electronic device, component, or system) at least first frame rate parameters for a first animation source. The first frame rate parameters may include at least one of a minimum frame rate, a maximum frame rate, and a preferred frame rate for the first animation source. For example, the first frame rate parameters may be recorded by a frame rate arbiter of an electronic device, such as frame rate arbiter 800, as described herein.

In one or more implementations, the first animation source includes a scrolling animation source, and the scrolling animation source determines the first frame rate parameters by: receiving a user scrolling input; and applying the user scrolling input to a model (e.g., a human perception model) to obtain the first frame rate parameters. The scrolling animation source may be a system process or an application process that animates scrolling content for display, such as in response to a swipe or other scrolling-indicator input from a user (e.g., via a touch input to a touch-sensitive surface or a touch-sensitive display, using a finger or a stylus).

In one or more implementations, the first animation source includes a generic (e.g., non-scrolling) animation source, and the generic animation source determines the first frame rate parameters by determining at least a maximum rate at which the generic animation source is able to generate frames. As examples, a generic animation source may be a battery indicator, a signal strength indicator, a process indicator, or a button function indicators, as in the example of FIG. 3.

At block 1304, the process 1300 includes determining a global frame rate based on recorded frame rate parameters, the recorded frame rate parameters including at least the first frame rate parameters. In one or more implementations, the recorded frame rate parameters include the first frame rate parameters and second frame rate parameters for a second animation source for concurrent display with the first animation source. In one or more implementations, the first frame rate parameters may include the minimum frame rate, the maximum frame rate, and the preferred frame rate for the first animation source and the second frame rate parameters may include a minimum frame rate, a maximum frame rate, and a preferred frame rate for the second animation source.

At block 1306, the process 1300 includes notifying at least the first animation source of the determined global frame rate (e.g., as described above in connection with FIG. 8). In one or more implementations, determining the global frame rate includes setting the global frame rate to the higher of the preferred frame rate for the first animation source and the preferred frame rate for the second animation source (e.g., as discussed above in connection with FIG. 12E). In one or more implementations, determining the global frame rate includes setting the global frame rate to the higher of the minimum frame rate for the first animation source and the minimum frame rate for the second animation source (e.g., as discussed above in connection with FIG. 12C).

In one or more implementations, the process 1300 may also include, after determining the global frame rate: receiving an update to the second frame rate parameters to remove the preferred frame rate from the second frame rate parameters; and modifying the global frame rate responsive to the update (e.g., as discussed above in connection with FIG. 12C). In one or more implementations, the minimum frame rate, the maximum frame rate, and the preferred frame rate for the second animation source are a common frame rate, and determining the global frame rate includes setting the global frame rate to the common frame rate.

In one or more implementations, the process 1300 may also include notifying the second animation source of the global frame rate. In one or more implementations, the process 1300 may also include operating a display at the global frame rate. In one or more other implementations, the display may be operated at a frame rate other than the global frame rate (e.g., the display may override the global frame rate due to hardware and/or other display settings, conditions, and/or content). In one or more implementations, the process 1300 may also include receiving frames from the first animation source at the global frame rate; and receiving frames from the second animation source at a frame rate that is different from the global frame rate and a factor of the global frame rate (e.g., as discussed above in connection with FIGS. 12G and 12H).

As discussed herein, the frame rate arbitration operations may also include arbitrating frame rate parameters for an input source (e.g., for the touch sensitive elements of a touch screen or other touch-sensitive surface, for input signals from a stylus, a mouse, a keyboard, a camera, or any other input source). For example, the process 1300 may also include recording at least second frame rate parameters for a first input source. The second frame rate parameters include at least one of a minimum frame rate, maximum frame rate, and preferred frame rate for the first input source. In one or more implementations, the process 1300 may also include notifying at least the first input source of the determined global frame rate.

In one or more implementations, the process 1300 may also include interpolating input events for the first input source based on the determined global frame rate. For example, a input source may receive input frames (e.g., touch inputs) at an input frame rate, such as 120 Hz (as an example). In one or more implementations, the input frame rate may not be aligned with the current global frame rate for animation and/or with the current refresh rate of the display. For example, for a display with variable refresh rate and a maximum refresh rate of 120 Hz, and in the example of an input source that provides input events at an input frame rate of 120 Hz, if the global frame rate is set to an odd-quanta frame rate, such as 80 Hz, the electronic device 105 or the input device may interpolate between some 120 Hz touch input events to generate estimated (interpolated) touch input events for each 80 Hz display frame. As another example, for a display operating at a refresh rate of 240 Hz and in the example of an input source that provides input events at an input frame rate of 120 Hz, an electronic device may interpolate between 120 Hz touch input events to generate interpolated input events with a 240 Hz frame rate that matches the 240 Hz current refresh rate of the display.

In one or more implementations, the recorded frame rate parameters may include the first frame rate parameters and second frame rate parameters and third frame rate parameters, where the second frame rate parameters and the third frame rate parameters each correspond to a respective animation with in a single layer tree of a second animation source (e.g., as described above in connection with FIG. 9).

Figure 14:
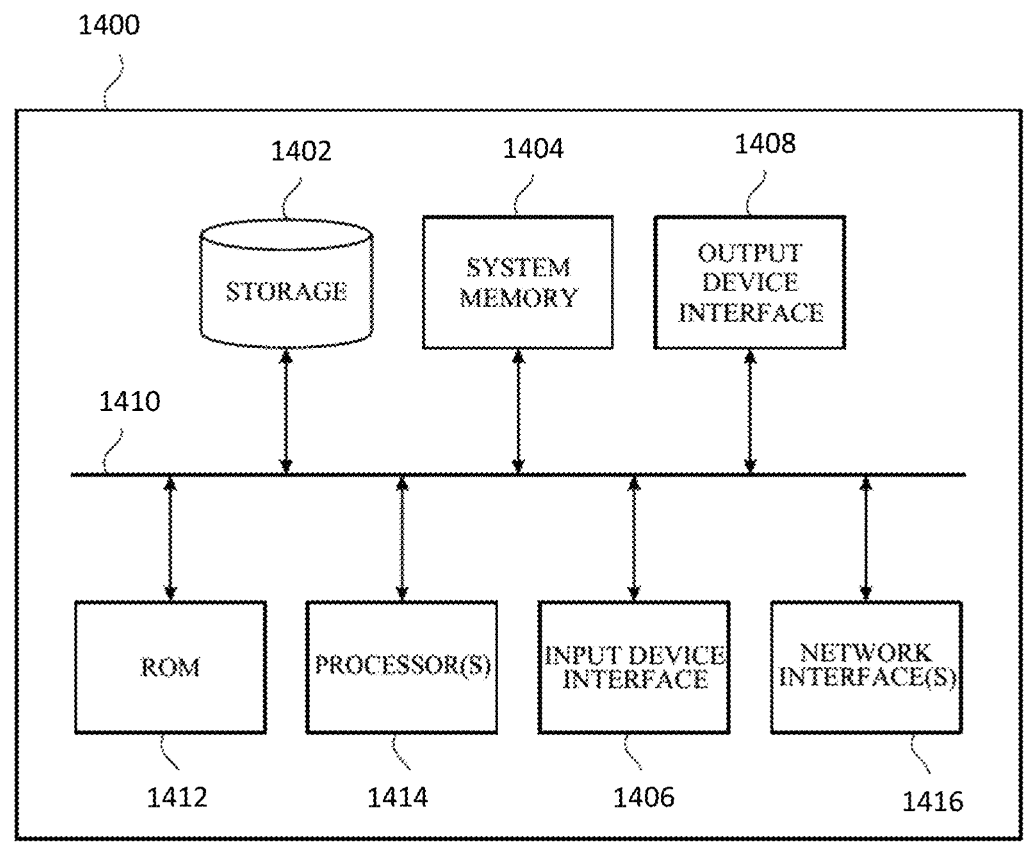
FIG. 14 illustrates an example computing device with which aspects of the subject technology may be implemented.

FIG. 14 illustrates an example computing device with which aspects of the subject technology may be implemented in accordance with one or more implementations. The computing device 1400 can be, and/or can be a part of, any computing device or server for generating the features and processes described above, including but not limited to a laptop computer, a smartphone, a tablet device, a wearable device such as a goggles or glasses, and the like. The computing device 1400 may include various types of computer readable media and interfaces for various other types of computer readable media. The computing device 1400 includes a permanent storage device 1402, a system memory 1404 (and/or buffer), an input device interface 1406, an output device interface 1408, a bus 1410, a ROM 1412, one or more processing unit(s) 1414, one or more network interface(s) 1416, and/or subsets and variations thereof.

The bus 1410 collectively represents all system, peripheral, and chipset buses that communicatively connect the numerous internal devices of the computing device 1400. In one or more implementations, the bus 1410 communicatively connects the one or more processing unit(s) 1414 with the ROM 1412, the system memory 1404, and the permanent storage device 1402. From these various memory units, the one or more processing unit(s) 1414 retrieves instructions to execute and data to process in order to execute the processes of the subject disclosure. The one or more processing unit(s) 1414 can be a single processor or a multi-core processor in different implementations.

The ROM 1412 stores static data and instructions that are needed by the one or more processing unit(s) 1414 and other modules of the computing device 1400. The permanent storage device 1402, on the other hand, may be a read-and-write memory device. The permanent storage device 1402 may be a non-volatile memory unit that stores instructions and data even when the computing device 1400 is off. In one or more implementations, a mass-storage device (such as a magnetic or optical disk and its corresponding disk drive) may be used as the permanent storage device 1402.

In one or more implementations, a removable storage device (such as a floppy disk, flash drive, and its corresponding disk drive) may be used as the permanent storage device 1402. Like the permanent storage device 1402, the system memory 1404 may be a read-and-write memory device. However, unlike the permanent storage device 1402, the system memory 1404 may be a volatile read-and-write memory, such as random access memory. The system memory 1404 may store any of the instructions and data that one or more processing unit(s) 1414 may need at runtime. In one or more implementations, the processes of the subject disclosure are stored in the system memory 1404, the permanent storage device 1402, and/or the ROM 1412. From these various memory units, the one or more processing unit(s) 1414 retrieves instructions to execute and data to process in order to execute the processes of one or more implementations.

The bus 1410 also connects to the input and output device interfaces 1406 and 1408. The input device interface 1406 enables a user to communicate information and select commands to the computing device 1400. Input devices that may be used with the input device interface 1406 may include, for example, alphanumeric keyboards and pointing devices (also called "cursor control devices"). The output device interface 1408 may enable, for example, the display of images generated by computing device 1400. Output devices that may be used with the output device interface 1408 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 14, the bus 1410 also couples the computing device 1400 to one or more networks and/or to one or more network nodes through the one or more network interface(s) 1416. In this manner, the computing device 1400 can be a part of a network of computers (such as a LAN, a wide area network ("WAN"), or an Intranet, or a network of networks, such as the Internet. Any or all components of the computing device 1400 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components (e.g., computer program products) and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:

providing, from a first animation source and to a system process, first frame rate parameters corresponding to a first animated content generated by the first animation source, the first frame rate parameters including at least one frame rate parameter different from a first global frame rate previously received by the first animation source;

receiving, from the system process, a second global frame rate based on the first frame rate parameters and second frame rate parameters corresponding to a second animated content provided by a second animation source, wherein the second global frame rate is different from the first global frame rate; and switching a first frame rate for the first animation content to a second frame rate compatible with the second global frame rate at a scheduled transition timing.

2. The method of claim 1, further comprising:

receiving, with the second global frame rate, a time stamp indicating the scheduled transition timing when the switching is to occur.

3. The method of claim 1, wherein the scheduled transition timing of switching corresponds to a VSYNC signal.

4. The method of claim 1, wherein, after receiving the second global frame rate and prior to switching the first frame rate for the first animation content, the second animation source provides updated second frame rate parameters to the system process, the method further comprising:

receiving a third global frame rate different from the second global frame rate, the third global frame rate based on the first frame rate parameters and the updated second frame rate parameters, the third global frame rate replacing the second global frame rate.

5. The method of claim 1, wherein the first frame rate parameters include two or more of a minimum frame rate, a maximum frame rate, or a preferred frame rate.

6. The method of claim 1, further comprising:
after switching the first frame rate for the first animation content, providing the first animated content at an even-quanta of the second global frame rate to a rendering service.

7. The method of claim 1, wherein the first frame rate parameters include a minimum frame rate and a maximum frame rate, wherein the second frame rate comprises a frame rate which is interposed between the minimum frame rate and the maximum frame rate, and which is closest to the second global frame rate.

8. The method of claim 1, wherein the first animated content corresponds to a scrolling animation, and wherein the first animation source is configured to determine the first frame rate parameters by:
receiving a user scrolling input; and
applying the user scrolling input to a model to obtain the first frame rate parameters.

9. An electronic device comprising:
a memory; and
one or more processors configured to:
provide, from a first animation source and to a system process, first frame rate parameters corresponding to a first animated content generated by the first animation source, the first frame rate parameters including at least one frame rate parameter different from a first global frame rate previously received by the first animation source;
receive, from the system process, a second global frame rate based on the first frame rate parameters and second frame rate parameters corresponding to a second animated content provided by a second animation source, wherein the second global frame rate is different from the first global frame rate; and
switch a first frame rate for the first animation content to a second frame rate compatible with the second global frame rate at a scheduled transition timing.

10. The electronic device of claim 9, wherein the one or more processors are further configured to:
receive, with the second global frame rate, a time stamp indicating the scheduled transition timing when the switching is to occur.

11. The electronic device of claim 9, wherein the scheduled transition timing of switching corresponds to a VSYNC signal.

12. The electronic device of claim 9, wherein, after receiving the second global frame rate and prior to switching the first frame rate for the first animation content, the second animation source provides updated second frame rate parameters to the system process, and wherein the one or more processors are further configured to:
receive a third global frame rate different from the second global frame rate, the third global frame rate based on the first frame rate parameters and the updated second frame rate parameters, the third global frame rate replacing the second global frame rate.

13. The electronic device of claim 9, wherein the first frame rate parameters include two or more of a minimum frame rate, a maximum frame rate, or a preferred frame rate.

14. The electronic device of claim 9, further comprising:
after switching the first frame rate for the first animation content to the second frame rate, providing the first animated content at an even-quanta of the second global frame rate to a rendering service.

15. The electronic device of claim 9, wherein the first frame rate parameters include a minimum frame rate and a maximum frame rate, wherein the second frame rate comprises a frame rate which is interposed between the minimum frame rate and the maximum frame rate, and which is closest to the second global frame rate.

16. The electronic device of claim 9, wherein the first animated content corresponds to a scrolling animation, and wherein the one or more processors are further configured to determine the first frame rate parameters by:
receiving a user scrolling input; and
applying the user scrolling input to a model to obtain the first frame rate parameters.

17. The method of claim 1, wherein the switching is performed in response to control signals from the system process that include timing information indicating when the scheduled transition timing is to occur.

18. The method of claim 17, wherein the control signals further include learned information based on prior animation behavior or input-derived frame-rate parameters.

19. A non-transitory machine-readable medium storing instructions which, when executed by one or more processors, cause the one or more processors to perform operations including:
providing, from a first animation source and to a system process, first frame rate parameters corresponding to a first animated content generated by the first animation source, the first frame rate parameters including at least one frame rate parameter different from a first global frame rate previously received by the first animation source;
receiving, from the system process, a second global frame rate based on the first frame rate parameters and second frame rate parameters corresponding to a second animated content provided by a second animation source, wherein the second global frame rate is different from the first global frame rate; and
switching a first frame rate for the first animation content to a second frame rate compatible with the second global frame rate at a scheduled transition timing.

20. The non-transitory machine-readable medium of claim 19, the operations further including:
after switching the first frame rate for the first animation content to the second frame rate, providing the first animated content at an even-quanta of the second global frame rate to a rendering service, wherein the scheduled transition timing of switching corresponds to a VSYNC signal or a time stamp provided by the system process.

* * * * *